(12) United States Patent
Tynkkynen et al.

(10) Patent No.: US 8,425,721 B2
(45) Date of Patent: Apr. 23, 2013

(54) METHOD AND APPARATUS FOR TREATING A FIBROUS WEB

(75) Inventors: Topi Tynkkynen, Vantaa (FI); Tapio Pitkäniemi, Haarajoki (FI); Stig Renvall, Hyvinkää (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 13/096,741

(22) Filed: Apr. 28, 2011

(65) Prior Publication Data

US 2012/0111516 A1    May 10, 2012

(30) Foreign Application Priority Data

Apr. 29, 2010 (FI) ...................................... 20105468

(51) Int. Cl.
*D21F 11/00*  (2006.01)
*D21G 1/00*  (2006.01)
*D21H 23/50*  (2006.01)

(52) U.S. Cl.
USPC ........... 162/136; 162/204; 162/205; 427/361; 427/427.1

(58) Field of Classification Search ................ 162/202, 162/204–207, 135–137; 427/421.1, 427.1, 427/427.3, 361, 391; 34/380, 398–399, 443–444; 239/8
See application file for complete search history.

(56) References Cited

U.S. PATENT DOCUMENTS

| | | | |
|---|---|---|---|
| 1,629,681 A * | 5/1927 | Cram ........................ | 100/162 R |
| 3,014,832 A * | 12/1961 | Donnelly ..................... | 162/111 |
| 3,024,129 A * | 3/1962 | Brundige ..................... | 427/364 |
| 3,838,000 A * | 9/1974 | Urbas .......................... | 162/207 |
| 4,207,143 A * | 6/1980 | Glomb et al. ............... | 162/207 |
| 4,274,210 A * | 6/1981 | Stengard ..................... | 34/641 |
| 4,351,700 A * | 9/1982 | Dove ........................... | 162/252 |
| 4,836,894 A * | 6/1989 | Chance et al. .............. | 162/253 |
| 5,331,749 A * | 7/1994 | Thiele ......................... | 34/117 |
| 5,522,312 A * | 6/1996 | Johnson ...................... | 100/74 |
| 5,524,532 A * | 6/1996 | Koivukunnas et al. ...... | 100/38 |
| 5,607,553 A * | 3/1997 | Chadha ....................... | 162/205 |
| 5,689,897 A * | 11/1997 | Schiel .......................... | 34/114 |
| 5,778,559 A * | 7/1998 | Winheim ..................... | 34/611 |

(Continued)

FOREIGN PATENT DOCUMENTS

| | | |
|---|---|---|
| DE | 102008021541 A1 | 11/2008 |
| DE | 102011017672 A1 * | 11/2011 |

(Continued)

*Primary Examiner* — Jose A Fortuna
(74) *Attorney, Agent, or Firm* — Stiennon & Stiennon

(57) ABSTRACT

Treatment liquid is sprayed onto a fibrous web surface by one or more spray boxes (21, 11, 23) having a spray chamber (4) and spray nozzles (1) in the travel direction of the fibrous web before a nip (N1 . . . N7; N8; N9) formed between them by two nip means (11 . . . 18) provided with a movable surface, and air and/or treatment medium mist is removed from the spray chamber and after having added treatment liquid the fibrous web is pressed in this nip. The spray chamber (4) is formed between a first spray box (21, 11, 23; 24; 25) and any successive first nip means (13; 52, 53; 62, 63) and second nip means (13; 52, 53; 62, 63), the fibrous web is guided supported by the surface of the first nip means to the spray chamber and the fibrous web is supported thereon during the spraying of treatment liquid.

20 Claims, 4 Drawing Sheets

U.S. PATENT DOCUMENTS

| | | | |
|---|---|---|---|
| 5,938,895 A | 8/1999 | Hirvonen | |
| 6,142,391 A * | 11/2000 | Seyed-Yagoobi et al. | 239/524 |
| 6,171,653 B1 * | 1/2001 | Kohl et al. | 427/377 |
| 6,203,858 B1 | 3/2001 | Plomer | |
| 6,280,574 B1 | 8/2001 | Bauer | |
| 6,306,461 B1 * | 10/2001 | Leino et al. | 427/356 |
| 6,444,030 B1 * | 9/2002 | Kohl et al. | 118/63 |
| 6,613,195 B2 * | 9/2003 | Anderson | 162/289 |
| 6,881,301 B2 * | 4/2005 | Heikkinen et al. | 162/206 |
| 6,998,021 B2 * | 2/2006 | Mantyla et al. | 162/263 |
| 7,022,185 B2 * | 4/2006 | Nissinen et al. | 118/325 |
| 7,125,473 B2 * | 10/2006 | Anderson | 162/263 |
| 7,879,408 B1 * | 2/2011 | Rantanen | 427/427.3 |
| 8,062,479 B2 * | 11/2011 | Begemann et al. | 162/289 |
| 2001/0008181 A1 * | 7/2001 | Anderson | 162/204 |
| 2001/0029682 A1 * | 10/2001 | Pellinen | 34/452 |
| 2003/0000465 A1 * | 1/2003 | Eichinger | 118/400 |
| 2003/0000673 A1 * | 1/2003 | Anderson | 162/207 |
| 2003/0056920 A1 * | 3/2003 | Winheim et al. | 162/207 |
| 2004/0025720 A1 * | 2/2004 | Heikkinen et al. | 100/327 |
| 2004/0035539 A1 * | 2/2004 | Komulainen et al. | 162/193 |
| 2004/0159413 A1 * | 8/2004 | Taylor et al. | 162/135 |
| 2005/0098284 A1 * | 5/2005 | Heikkinen et al. | 162/135 |
| 2005/0224200 A1 * | 10/2005 | Bouchard et al. | 162/123 |
| 2006/0111808 A1 * | 5/2006 | Burma | 700/129 |
| 2007/0089844 A1 * | 4/2007 | Begemann et al. | 162/119 |
| 2008/0135196 A1 | 6/2008 | Backman et al. | |
| 2010/0300635 A1 * | 12/2010 | Mausser et al. | 162/199 |
| 2012/0055644 A1 * | 3/2012 | Mausser et al. | 162/210 |
| 2012/0111516 A1 * | 5/2012 | Tynkkynen et al. | 162/133 |
| 2012/0138249 A1 | 6/2012 | Sundholm et al. | |

FOREIGN PATENT DOCUMENTS

| | | |
|---|---|---|
| EP | 0670004 B1 | 3/1995 |
| FI | 20075348 | 11/2008 |
| WO | WO 9850169 A1 * | 11/1998 |

* cited by examiner

METHOD AND APPARATUS FOR TREATING A FIBROUS WEB

CROSS REFERENCES TO RELATED APPLICATIONS

This application claims priority on Finnish App. No. FI 20105468, filed Apr. 29, 2010, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method and an apparatus for treating a fibrous web. Particularly, but not solely, the invention relates to a method and an apparatus for sizing and calendering paper and board.

The sizing and calendering of paper and board utilize a separate size press and calender. The size press can employ, inter alia, pond sizing technology or film transfer technology. The separate apparatuses required by the arrangement make the apparatus expensive and the apparatus consumes plenty of space in the machine line.

For moistening and calendering paper and board, it is possible to use a wetstack calender where the set of rolls of the calender is provided with one or several water boxes.

Patent specification U.S. Pat. No. 5,938,895 describes a calender where water is dosed via the lip of a water box onto the surface of a calender roll.

Patent specification U.S. Pat. No. 6,280,574 describes a calender where water is dosed as a film directly onto a fibrous web before a calendering nip and water is scraped from the fibrous web before the calendering nip to form a thin water film.

Patent specification EP0670004B1 describes a method and an apparatus for coating a traveling material web. Liquid is indirectly dosed onto the web by spraying the liquid on a roll shell from where the liquid is transferred onto the web.

Published application DE102008021541A1 describes a method in which treatment medium is sprayed onto an unsupported fibrous web in a spraying chamber and the web is guided within the spraying chamber to a press nip.

When manufacturing board, such as packing board and fluting board, strength required by the end-product can be provided by using virgin fibrous material. The use of recycled fiber weakens board strength. When manufacturing board of recycled fibers, the board can be treated on the size press where starch is added to the board by surface sizing. Using starch aims at compensating the weakening of board strength due to the use of recycled fiber.

However, a limitation of the traditional size press technology is the dosing of large starch quantities or dosing a sufficient starch quantity in recent high-speed board machines. In the traditional size press, only a specific amount of wet film can be spread onto the roll without a pond forming in the nip. As ponds form in the nip, starch starts to splash and the additional dosing of starch onto the roll does not necessarily increase the amount of starch in the web.

SUMMARY OF THE INVENTION

According to a first aspect of the invention, supplying an apparatus for treating a fibrous web, which apparatus comprises one or more spray boxes comprising a spray chamber and spray nozzles for spraying treatment liquid onto the surface of the fibrous web in the travel direction of the fibrous web before a nip formed between them by two nip means provided with a movable surface, and the spray box comprises a removal means for removing air and/or treatment medium mist from the spray chamber, and there are one or more of said nips in the apparatus, and the apparatus comprises means after having added treatment liquid for pressing the fibrous web in this nip. The apparatus comprises one or more first spray boxes, which is arranged to form a spray chamber with any first nip means and second nip means between them, and the fibrous web is arranged supportable on the moving surface of the first nip means during the spraying of treatment liquid.

The spray chamber and the spray box can be in the apparatus and method in any nip in the group of successive nips formed in some cases by the nip means. Hence, the spray chamber first in order along the path of the fibrous web is not necessarily always in the first nip in the order of the apparatus between the first and the second nip means, but the first spray unit can be in the subsequent nips.

The nip means i.e., nip forming structures, can comprise a roll; a belt; a wire; a combination of a roll and a belt; a combination of a roll and a wire; or an equivalent press means, which comprises in the nip a movable surface fitted against the fibrous web.

The removal means advantageously comprises a suction box.

The apparatus can further comprise one or more second spray boxes, the spray chamber of which is formed between the surface of an unsupported fibrous web guided to the nip and the surface of the nip means and the second spray box.

Advantageously, the apparatus comprises a flow limiter device which is arranged between the first and/or the second spray box and a nip means not participating in the support of the fibrous web for limiting the flow of air and treatment medium mist between the spray chamber and the exterior of the spray chamber. The flow limiter device can be fastened on the edge of a suction opening comprised by the suction box which is the outer one seen from the direction of the spray chamber. The flow limiter device can comprise a joint or a hinge or a spring or elastic material.

Advantageously, the spray nozzles are arranged in the first and/or the second spray box on the side of the entry of the fibrous web leading to the spray chamber.

Advantageously, the nip means is covered or treated in a way preventing the fibrous web from adhering. The nip means can be heatable.

According to some embodiments, at least one spray box is fitted into connection with the nip of the set of rolls of the wetstack calender, advantageously instead of the water box.

According to a second aspect of the invention; supplying a method for treating a fibrous web, in which method, by means of one or more spray boxes comprising a spray chamber and spray nozzles, spraying treatment liquid onto the surface of the fibrous web in the travel direction of the fibrous web before a nip formed between them by two nip means provided with a movable surface, and removing air and/or treatment medium mist from the spray chamber and after having added treatment liquid pressing the fibrous web in this nip. In the method, forming the spray chamber between a first spray box and any successive first nip means and second nip means, guiding the fibrous web supported by the surface of the first nip means into the spray chamber and supporting the fibrous web on said surface during the spraying of treatment liquid.

Advantageously, the treatment medium is sprayed non-air-assisted.

Advantageously further in the method, the spray chamber is formed between the surface of an unsupported fibrous web and one nip means and the spray box.

The flow of air and treatment medium mist can be limited between the spray box and a nip means not participating in the support of the fibrous web.

Advantageously, the spray nozzles of the spray box are arranged on the side of the entry of the fibrous web leading to the spray chamber.

Advantageously, the sprayed treatment medium is water or an agent strengthening the fibrous web or their mixtures.

The nip means can be heatable.

Advantageously, a first fibrous-web layer is guided to the nip on the side of the first nip means and a second fibrous-web layer on the side of the second nip means.

The spraying of treatment medium of fibrous material onto the surface of the fibrous web can by means of the spray technique described in this specification provide considerable advantages in the manufacture of the fibrous web.

Particularly dosing implemented by spraying can be described to be contact-free because, in connection with and after spraying, there is no need to mechanically spread the treatment medium onto the fibrous web nor onto the surface of any roll. After dosing implemented by the spray box, there is no need to mechanically scrape the treatment medium off the surface of the fibrous web or roll. This decreases the risk of a web break and, in some cases, also enables the increase of run speed. In many cases, it enables increasing the quantity dosed onto the surface of the fibrous web. In the dosing of treatment medium implemented by the spray box, it is possible to avoid the known mechanical scraping of press rolls e.g. by doctor blades or bars, which wears the roll surfaces. The adjustment of the distance of the spray box from the roll during treatment is not necessary, and expensive measurement and adjustment arrangements for adjusting the location of the box during use can be avoided. It is possible to install the spray box in one location and the position can be kept the same during treatment. If the position or diameter of the rolls forming the spray chamber varies, or the path of the fibrous web being part of the spray chamber changes in the apparatus, the position of the spray box can be changed once to correspond to the changed situation.

The suction box comprised by the spray box can maintain suction which prevents the treatment medium mist generated in the spray event from spreading to the environment. The position of the spray box being suitably close to the spray target, it is possible to control air flows and treatment medium mist flows in a favorable way at the spray target. Said flows can be controlled and the amount of flows can be affected by locating the spray box suitably close to a gap formed by nip rolls or a gap formed by a nip roll and the fibrous web.

The air flows and treatment medium mist flows in the spray event can also be controlled by a flow limiter device installable in the spray box when required. The limiter device can prevent the access of excessive air in the spray area between the spray box and the gap, whereby the suction power of the flow being sucked can be decreased or the suction power can provide a more powerful suction effect. On the other hand, the limiter device can prevent the flow of treatment medium mist from accessing outside the spray event between the spray box and the gap and thus promote the environment staying clean.

The flow limiter device can be fastened in an adjustable way to the spray box, e.g. on the outer edge of the elongated suction opening comprised by the suction box, which suction opening leads to the spray chamber. The limited quantity of flow provided by the limiter device can be adjusted e.g. by rotating some part of the limiter device supported by a joint or by moving along a linear path, or the limiter device can comprise elastic material. The part of the limiter device being of elastic material can be set with the spray box against the roll forming one wall of the spray chamber, on the surface of which, there is no fibrous web supported at the point of the limiter device. The limiter device or the part of the limiter device can be adjusted close to the roll or, if required, even into a contact with the roll to limit the flow between the roll and the spray box.

Spray sizing technology improving the strength and surface properties of the fibrous web can enhance the manufacture of a fibrous web, particularly of board manufactured of recycled fiber, and decrease the costs of a treatment apparatus. In some particularly advantageous cases, the manufacturing costs of the fibrous web can be decreased when the quantity of dosed starch or other treatment medium can be increased and, simultaneously, to decrease the use of virgin fiber.

The treatment implemented with the apparatus can decrease splashing occurring in known size press apparatuses. The treatment implemented with the apparatus can decrease the spread of treatment medium mist to the environment occurring in known spray apparatuses.

The strength and surface properties of the fibrous web can be improved and the treatment of the fibrous web can be intensified. Compared to the traditional surface sizing, the smoothness of the fibrous web is better (the fibrous web smoother) in the case according to advantageous embodiments of the invention. The known roughening of the fibrous web caused by the dosing of treatment liquid (e.g. water-starch mixture) onto the fibrous web in surface sizing after the size press can be considerably decreased by pressing the fibrous web in the press nip after having sprayed the treatment medium. The press nip can be heatable. At least one of the rolls forming the nip after the spraying is advantageously heatable, but this is not necessary. The roll in connection with the nip can be e.g. a thermo roll.

In many cases, the costs of the apparatus can be decreased. Such a possibility can arise e.g. in such a situation in which the same device can implement combined surface sizing and calendering. In the dosing of starch implemented by spray technology, it is in some cases possible to provide lower residual moisture to the fibrous web than in a traditional size press. Sometimes, it is possible to cease using a lot of space consuming drying cylinders after the surface sizing. The drying can be implemented on the surface of a roll being in connection with a surface sizing nip or on the surfaces of rolls being in the same apparatus after the surface sizing nip. It is then possible to implement the surface-sizing apparatus as small space consuming in the machine line, which also enables the construction costs being low. The press apparatus implemented by spray technology can be realized in existing or new manufacturing lines of a fibrous web. Particularly when considering the modernization of an existing manufacturing line, it is advantageous to explore the possibility of locating a spray box or boxes as the dosing device of treatment medium instead of existing water boxes or into connection with size press devices and calenders as a dosing device.

In the dosing of treatment medium onto the fibrous web implemented by spray technology, it is possible to choose if wishing to spray the treatment medium on one side of the fibrous web (one-sided sizing) or on both sides (two-sided sizing) before the press nip. The advantages of the one-sided treatment of paper or board are emphasized e.g. in the manufacture of liner. Liner typically requires smoothness only on one side of the web.

In some embodiments of surface sizing, the use of large-diameter press rolls with a soft surface can be ceased. Instead of soft-surfaced rolls, it is possible to use steel rolls with a hard surface or hard roll covers, because there is no need for the treatment medium to form a uniform smooth film onto the surface sizing roll. Then, the roll cover of the surface sizing roll is no longer required the properties of a known soft-surfaced roll of surface sizing technology. Contrary to teachings predominated earlier, it has been unexpectedly observed that, in surface sizing, it is possible to employ rolls of smaller diameter, which can be hard-surfaced, than the ones in size press technology.

The treatment of the fibrous web can be diversified by means of the treatment medium sprayed. The spraying enables choosing the spray medium from a wide range of different treatment mediums. The treatment medium can be e.g. coating color, silicone, PVA, color or some other equivalent liquid typically dosed onto paper or board. The fibrous web can be pigmented, and the treatment medium can be surface size with added pigment. The viscosity and the surface adherence properties of the treatment medium can be chosen more freely than in known size press technology in which the treatment medium must adhere and spread as an even layer onto the surface of the size press roll.

Wetstack calender technology implemented by spray boxes can enhance particularly the manufacture of board and provide the fibrous web with good strength properties and surface properties. The splashing of liquid occurring in known wetstack calendering implemented by water boxes can be decreased. The drying requirement after calendering required by known wetstack calendering implemented by water boxes can be decreased in wetstack calendering implemented by spray boxes. In some embodiments, the fibrous web can achieve a lower residual moisture after the treatment apparatus. In some embodiments, the run speed of the fibrous web can be increased due to the dosing of liquid implemented by spray boxes. In the wet press of board on the wetstack calender according to prior art, the dosing of liquid by the water box provides the board with sensitivity for web breaks due to the excess of water. The sensitivity of board for breaks decreases when dosing the treatment medium according to spray technology directly on the fibrous web and there is no need for the fibrous web to be scraped or doctored mechanically. The dosed treatment medium can be chosen in a way described above more freely than in known wetstack calendering by means of water boxes.

The transfer, dosage and penetration of starch along the liquid to the fibrous web can be improved by spray technology. A particularly advantageous example of this is the dosing of starch by spray technology in the cost-effective manufacture of packing boards of recycled fibers. In a manufacturing environment, there has been measured packing-board strengths of 140 g/m² and noticed that 5 g/m² of starch increases the strength of liner as much as 40 g/m² of recycled fiber. 5 g/m² of starch costs less than 40 g/m² of recycled fiber.

Different embodiments of the present invention are or were described only in connection with some aspect or aspects of the invention. It is understood by those skilled in the art that any embodiment of an aspect of the invention can be applied by oneself in the same aspect and other aspects of the invention or as a combination with other embodiments.

BRIEF DESCRIPTION OF THE DRAWINGS

The invention will now be described by way of examples with reference to the accompanying drawings.

DESCRIPTION OF THE PREFERRED EMBODIMENTS

In the following description, similar designations refer to similar parts. It should be noted that the presented figures are not to scale as a whole and they mostly serve only for the purpose of illustrating the embodiments of the invention.

FIGS. 1-6 show examples of apparatuses which can employ a spray box 19; 21, 22, 23; 24; 25 for dosing treatment liquid onto a fibrous web W in various positions. The spray box can spray the treatment liquid directly onto the surface of the fibrous web. The fibrous web can be unsupported or supported against a roll 11-18. In the figure, the spray box is located in a gap formed by the rolls or roll and the web. Then, an open spray chamber of the spray box can be formed between them by the actual spray box, the surface of the fibrous web supported on a first roll and the surface of a second roll, or the open spray chamber of the spray box can be formed between them by the spray box, the surface of an unsupported fibrous web and the surface of the roll.

The spray box can spray size, water, coating color, silicone, PVA, color or some other equivalent liquid typically dosed onto paper or board.

Advantageously, spraying by the spray box is non-air-dispersion spraying i.e. spray nozzles spray pressurized treatment liquid. The pressure of treatment liquid is advantageously generated by pumping the liquid. The treatment liquid is sprayed with pressure such that a liquid film is created onto the surface of the fibrous web. The pressure level is typically 2-10 bar, in some cases even 30-50 bar. The spray distance from the nozzles to the surface is typically more than 100 mm. When liquid coming from the spray nozzles of the spray box impacts the atmosphere, the liquid loses speed and forms small beads. The beads impact with high speed onto the fibrous web and form a continuous and covering liquid layer advantageously for surface sizing. In contact-free liquid dosing by means of spray nozzles, the nozzles can dose the same quantity of treatment liquid onto the surface of the fibrous web independent of the variations of base paper or base board. In some cases, the nozzles can also dose a different quantity of treatment liquid, which property can be used in web profiling. In the press nip after the spraying, the treatment medium (e.g. size, starch) is pressed by means of a liquid film onto the fibrous web. The liquid is dried at the next drying steps advantageously on the surfaces of heated roll or rolls or belt/belts, whereby the treatment medium binds to the fibrous web and provides the strengthening of the fibrous web.

Figure 2:
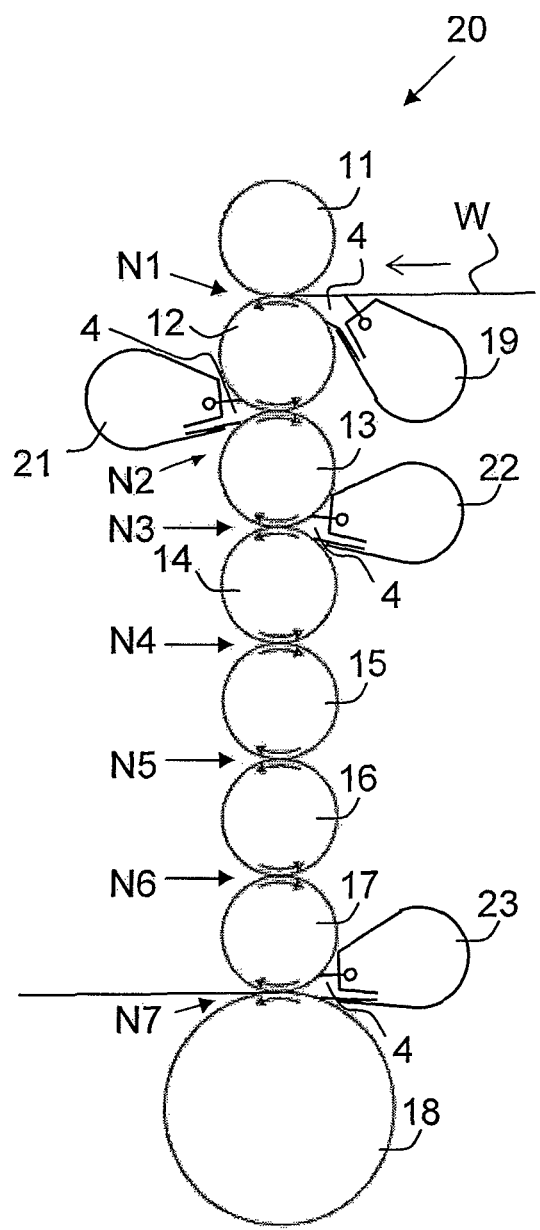
FIG. 2 shows a set of rolls of the wetstack type, in which liquid is dosed onto the fibrous web by spray boxes.

The spray box can replace the water box as the dosing device of the treatment liquid of the fibrous web (inter alia, in surface sizing) and in wet pressing (e.g. in a wetstack calender, FIG. 2). The spray box can also be located to a position where there already is no water box.

Figure 1:
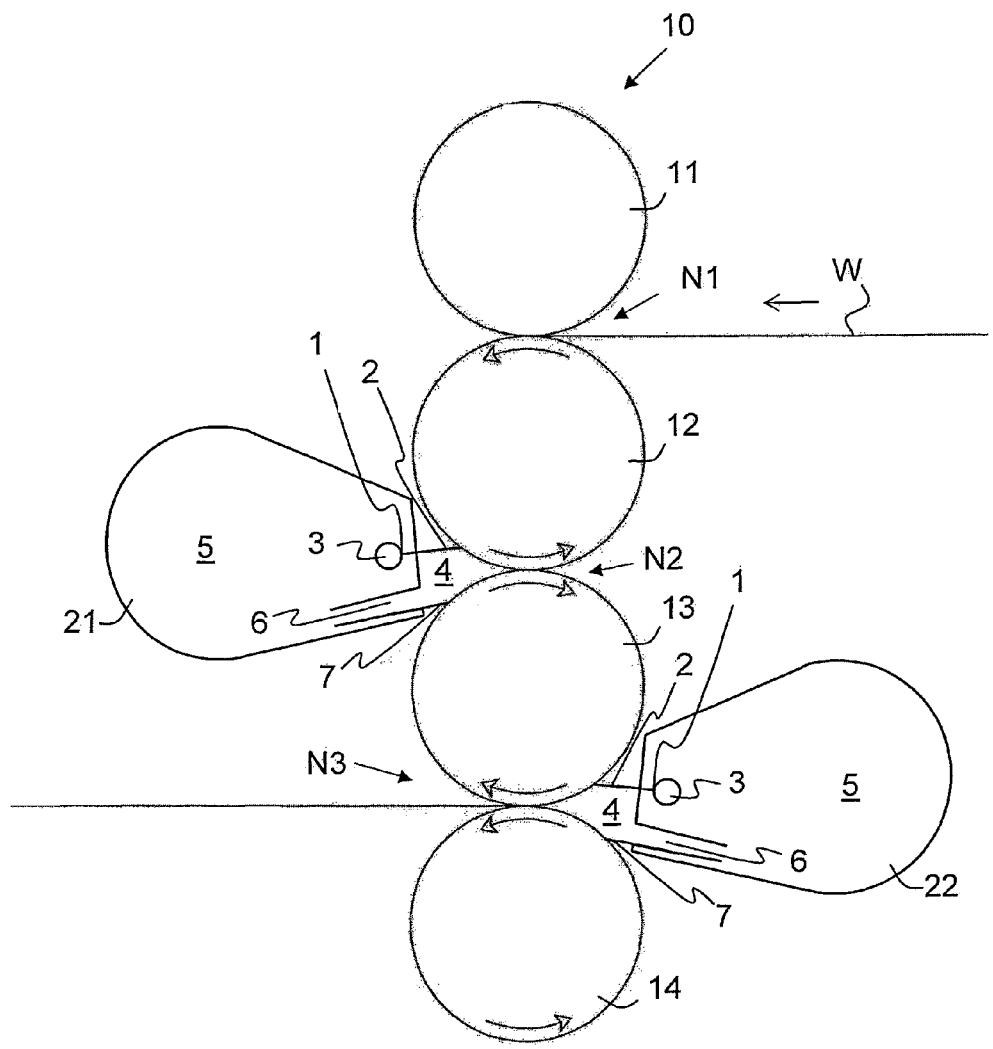
FIG. 1 shows a set of rolls suitable for treating a fibrous web, which is provided with spray boxes fitted into connection with two nips for spraying liquid directly onto one or both sides of the fibrous web supported on roll surfaces.

Next, the spray box will be described by means of FIG. 1, some of which are also located to different positions in FIGS. 2-6. In FIG. 1, a first spray box 21 comprises spray nozzles 1 for treatment medium sprayed with pressure with which the treatment medium is directed towards the fibrous web as a jet 2. The spray nozzles are advantageously fastened to a pressure pipe 3. The pressure pipe is advantageously directional, e.g. by rotating the pressure pipe in relation to its axis. Through the pressure pipe, the pressurized treatment liquid is guided advantageously within the spray beam 21 to the spray nozzles. The spraying of treatment medium is implemented to an open spray chamber 4 which is formed between the walls of the spray box and a gap.

The spray event creates mist the access of which outside the spray chamber 4 is limited by sucking the flow of air and treatment medium mist by a suction box 5 comprised by the spray box. The spray box comprises a suction opening 6 which leads from outside the spray box from the spray chamber 4 inside to the suction box 5. By means of the suction box 5, it is possible to maintain suction which prevents the treatment medium mist generated in the spray event from spreading to the environment.

The access of flow outside/inside the spray chamber 4 is also advantageously limited by locating the spray box 21 tightly close to the gap. The position of the spray box being suitable close to the walls of the spray chamber 4, it is possible to control air flows and treatment medium mist flows in a favourable way at the spray target. Said flows can be controlled and the amount of flows can be affected by locating the spray box suitably close to a gap formed by the nip rolls or a gap formed by the nip roll and the fibrous web.

If required, the spray box is provided with a flow limiter device 7. The limiter device 7 is used for controlling air flow and treatment medium mist flow in the spray event. In FIG. 1, on the outer edge of the suction opening 6 of the spray box 21 is installed the adjustable flow limiter device 7. The limiter device 7 can limit the quantity of flow adjustably by moving the limiter device in FIG. 1 along a linear path. The limiter device changes a slot between the spray box 21 and an adjacent roll 13. In some cases when pressing the limiter device onto the surface of the roll, there is no supported fibrous web on the roll surface at the point of the limiter device 7. By means of the limiter device 7 used when required, it is possible to avoid the suction of excess air to the spray chamber and to prevent the flow of treatment medium mist from accessing outside the spray chamber. In FIG. 1, the lower side of the spray box 21 is sealed against the roll 13 e.g. with a doctor blade or the slot between the box and the roll is substantially formed smaller than above the spray chamber 4, from where the path enters. This aims at minimizing the quantity of suction air.

The part of the limiter device being of elastic material or the part of the limiter device provided with an adjustable-power actuator can be set with the spray box against the roll forming one wall of the spray chamber 4, on the surface of which, there is no fibrous web supported at the point of the limiter device. The limiter device can comprise a hinge, a joint, a spring or a positioning means. The limiter device 7 or the part of the limiter device can be adjusted close to the roll or, if required, even into a contact with the roll to limit the flow between the roll and the spray box. The limiter device can also be used for limiting the flow between the fibrous web and the spray box (not shown in the figures), but then it is recommended to see to that the limiter device cannot contact the fibrous web. Contacting a wet fibrous web can cause web breaks and contacting a dry fibrous web can cause dust formation, which impedes the process.

In spray jetting, the treatment medium is spread onto the surface of the fibrous web before the nip and the fibrous web is guided to the press nip where the liquid partially penetrates within the web. As there is no need to scrape the web mechanically, it is possible to decrease the risk of the web wrinkling or breaking and to increase run speed or at least increase the certainty of the good continuation of the process.

The rolls and/or the belts being in connection with the spray box can be covered by a cover preventing the adherence of the treatment medium, such as size, which is not necessarily possible in the case of the known water box as it requires an ability to form a film. The cover material can have been arranged according to the properties of the treatment medium, such as coating material, such that the web travelling through the nip will not adhere to the roll surface. Non-adhering roll covers or surface treatment materials can be e.g. teflon, silicone, nano cover, ceramics, plastic composite or a resistance treatment made for the surface. The resistance treatment can be based on electric charges. The resistance treatment or cover can be based on the corona effect. The roll surface/roll surfaces of the press nip can have been formed hard.

FIG. 1 shows a set of rolls 10 which comprises four rolls 11-14 for pressing the fibrous web W in nips N1-N3 formed by two adjacent rolls. The fibrous web is guided to the set of rolls via a first nip N1 formed between them by a first roll 11 and a second roll 12 below it. After the nip N1, the fibrous web is guided supported by the rolls via a second nip N2 formed between them by the second roll 12 and a third roll 13 and further via a third nip N3 formed between them by the third roll 13 and a fourth roll 14 out of the set of rolls 10. The set of rolls 10 is provided with a first spray box 21 fitted into connection with the second nip N2 and a second spray box 22 fitted into connection with the third nip N3. One or both spray boxes 21, 22 can spray the treatment liquid directly onto the fibrous web supported on the roll surfaces. Onto one or both sides of the fibrous web it is thus possible to dose the liquid directly. In FIG. 1, the spray boxes are located in a gap formed between them by two rolls on the suction side of the nip i.e. on that side from which the fibrous web travels within the nip. The fibrous web enters the spray chamber 4 on the upper side on the side of the nozzles 1 of the spray beam and the limiter device 7 below the spray chamber aims at minimizing the quantity of suction air as well as limiting the spreading of treatment medium mist to the environment. In FIG. 1, the second roll 12 and the third roll 13 forming the second nip between them can be steel rolls with a hard surface, advantageously thermo rolls.

FIG. 2 shows a set of rolls 20 of the wetstack type, in which liquid is dosed onto the fibrous web W by spray boxes. The set of rolls 20 comprises eight adjacent and overlapping rolls 11-18 in order downwards from the top and the fibrous web is arranged to travel via each nip N1-N7 formed between them by adjacent rolls in order downwards from the top. Before bringing the fibrous web along a path equivalent to FIG. 1 to the set of rolls 20, it is possible to spray treatment medium onto an unsupported fibrous web by a spray box 19, the spray chamber 4 of which is formed by the lower surface of the fibrous web entering the set of rolls, the surface of a second roll 12 and the spray box 19. After the spray box 19, the fibrous web can be treated by the spray boxes 21 and 22 as shown in FIG. 1. Before a last nip N7 is arranged yet a spray box 23 in an equivalent way as the spray box 22 into connection with the nip N3. In the apparatus, different spray boxes can spray the same or a different treatment medium. FIG. 2 shows three spray boxes arranged to spray below the web, advantageously the spray boxes 19, 22 and 23, and one spray box arranged to spray above the web, advantageously the spray box 21. The position of the spray boxes can also be some other or their position can be changed in the apparatus on both sides of the fibrous web to provide a desired treatment. In the apparatus, it is possible to choose none, one or several spray boxes to be used.

Figure 3:
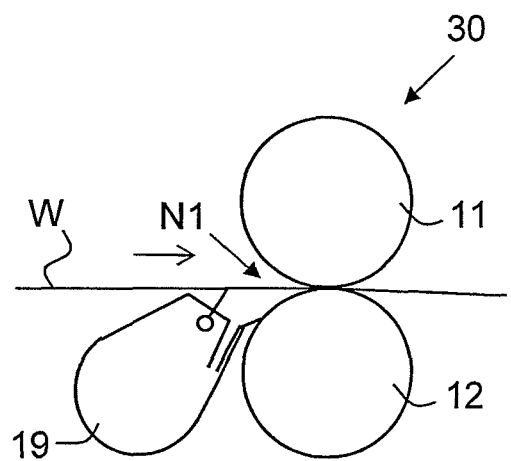
FIG. 3 shows an apparatus, in which a spray box sprays liquid directly onto one side of the fibrous web before a nip formed between them by two rolls.

FIG. 3 shows an apparatus or part of an apparatus, in which a spray box 19 sprays liquid directly onto one side of an unsupported fibrous web W before a press nip N1 formed between them by two rolls. A set of rolls 30 comprises a first roll 11 and a second roll 12. The first roll 11 is advantageously a heatable thermo roll with a hard surface. The spray chamber consists of the lower surface of the fibrous web entering the nip N1, the surface of a second roll 12 and the spray box 19. By means of the thermo roll 11, it is possible to convey heat to the press event, whereby the binding of treatment medium conveyed along the liquid can be intensified. With one-sided treatment, it is possible to size e.g. packing board. In the manufacture of packing board, the adding of treatment medium can replace the share of fiber in the board. Particularly in the case of packing board manufactured of recycled fiber, it is possible to decrease the share of recycled fiber.

Figure 4:
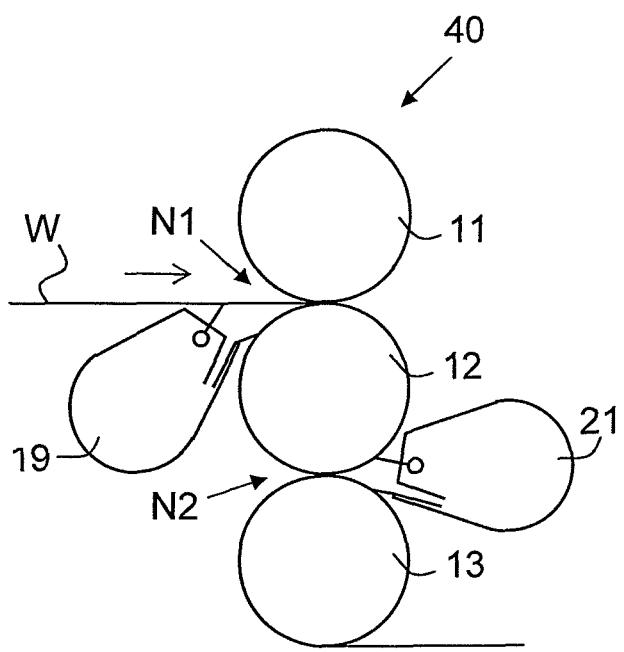
FIG. 4 shows an apparatus, which is provided with spray boxes fitted into connection with two nips for spraying liquid directly onto one or both sides of the fibrous web.

FIG. 4 shows an apparatus or part of an apparatus, which is provided with spray boxes 19, 21 fitted into connection with two nips N1, N2 for spraying liquid directly onto one or both sides of the fibrous web W. The spray chamber of the spray box 19 is formed to a set of rolls 40 of the lower surface of the fibrous web entering the nip N1, the surface of the second roll 12 and the spray box 19. After the nip N1, the fibrous web travels supported by the surface of the second roll 12 to the second nip N2 past the spray box 21. The spray box 21 was described in connection with FIG. 1. After the second nip, the fibrous web travels supported by the surface of a third roll 13 being below the second roll and exits the set of rolls 40 in its original travel direction in the figure from left to right. In the set of rolls, the first roll 11 above the second roll 12 is advantageously a heatable thermo roll with a hard surface.

It should be noticed that, in the spray sizing apparatus, the nip rolls can be rolls with a hard surface, thermo rolls or rolls with a polymer surface. It should also be noticed that the sets of rolls shown in the figures can also be in a position inclined from the vertical direction.

An advantageous impact point of spraying before the press nip is 0.4 meters.

In FIGS. 1-6, the slots between the spray boxes and the adjacent roll or belt or wire not supporting the fibrous web are closed totally or almost totally by the flow limiter device 7, but as well it might be that some of said points or all points can be without a limiter device or the limiter device is not used for limiting the flow of the slot.

Figure 5:
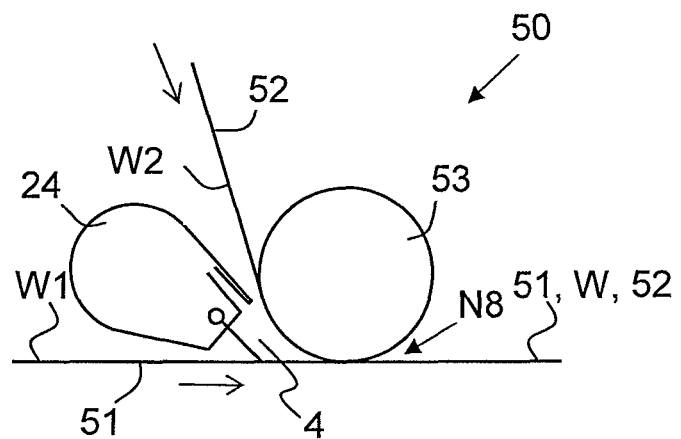
FIGS. 5 and 6 show advantageous embodiments of the apparatus.

FIG. 5 shows a fibrous-web treatment apparatus 50 according to advantageous embodiments, which is applicable for use at the wet end of a fibrous-web machine on the wire section. Two wires form when pressing against each other a nip N8 into connection with which is arranged a spray box 24. A first wire 51 forms a first nip means, supported by the surface of which a first layer W1 of the fibrous web W is guided to the nip N8 for sizing the two layers of the fibrous web by pressing. A second wire 52 and a wire guide roll 53 form a second nip means supported by the surface of which a second layer W1 of the fibrous web W is guided to the nip N8. In FIG. 5 in the spray chamber 4 of the spray box 24, treatment medium is sprayed onto the first layer W1 supported on the first wire but, as well, it is possible to spray the treatment medium onto the second layer W2. Naturally, only one fibrous web path can be supported on either of the nip means of the apparatus, whereby no combining of two fibrous-web layers occurs but surface sizing of one fibrous web on the wire section.

Figure 6:
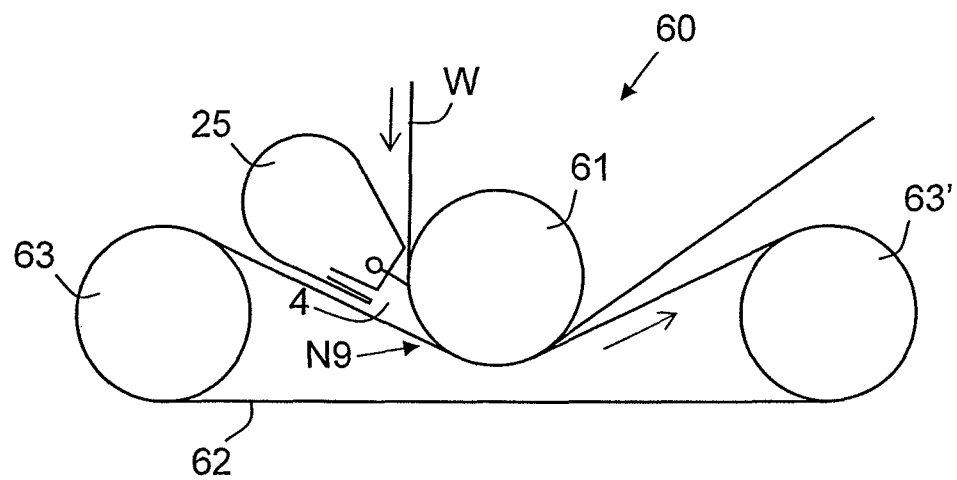

FIG. 6 shows a fibrous-web treatment apparatus 60 according to advantageous embodiments, in which the fibrous web W can be surface-sized between a belt and a roll. A roll 61 and a belt 62 form when pressing against each other a nip N9, into connection with which is arranged a spray box 25. The roll 61 forms a first nip means, supported by the surface of which the fibrous web W is guided to the spray chamber 4 to be sprayed with treatment medium and then to the nip N9. The belt 62 forms a second nip means. The endless belt 62 is guided around two or more belt guide rolls 63. In FIG. 6 in the spray chamber 4 of the spray box 25, treatment medium is sprayed on the fibrous web W. The belt can be soft-surfaced and its material can be e.g. polymer material. The belt can be hard-surfaced, e.g. a metal belt. The belt can be heatable. The belt can be heatable by means of the thermo roll. There can also be a belt between the roll 61 and the fibrous web W, whereby the fibrous web is pressed in the nip between two belts (not shown in the figure). In some embodiments, there can be at the point of the nip N9 also seen from the direction of the roll 61 on the opposite side of the belt 62 a counter roll, by means of which it is possible to diversify the operations of the nip N9 (not shown in the figure).

Also in the calender, e.g. in the wetstack calender shown by FIG. 2, some nip means can be formed instead of a roll by a roll and a belt together.

The above description offers non-limiting examples of some embodiments of the invention. It is evident to those skilled in the art that the invention is not still limited to the described details but the invention can also be implemented with other equivalent ways. Some features of the described embodiments can be utilized without using other features.

The above description should be considered as such only a depiction of the principles of the invention and not limiting the invention. Therefore, the scope of the invention is limited only by the enclosed claims.

We claim:

1. A method for treating a fibrous web with a liquid in a wetstack calender of at least three nip forming structures, the method comprising the steps of:

forming a liquid spray chamber between a first spray box and an adjacent first nip forming structure having a first movable surface and a second nip forming structure having a second movable surface, which first and second movable surfaces form a first nip of the wetstack calender;

guiding the fibrous web supported by the first movable surface of the first nip forming structure into the liquid spray chamber and into the first nip wherein motion of the web into the first nip defines a first direction;

spraying with spray nozzles, positioned by the first spray box, treatment liquid onto a surface of the fibrous web while the web is supported on said first movable surface, and spaced from the first nip in a direction opposite the direction defined by the motion of the web into the nip;

removing air or treatment medium mist from the liquid spray chamber;

after spraying treatment liquid onto the surface of the fibrous web pressing the fibrous web in the first nip;

forming a second liquid spray chamber between a second spray box and a surface of the fibrous web which is supported on the second nip forming structure or an adjacent third nip forming structure which is mounted for movement;

forming a second nip between the second nip forming structure or the adjacent third nip forming structure with a fourth nip forming structure of the wetstack calender;

guiding the fibrous web into the second liquid spray chamber and into the second nip;

spraying with spray nozzles, positioned by the second spray box, treatment liquid onto the surface of the supported fibrous web spaced upstream from the second nip;

removing air or treatment medium mist from the second liquid spray chamber; and after spraying treatment liquid onto the surface of the fibrous web pressing the fibrous web into the second nip;

wherein the first, second, and fourth rolls form at least part of the wetstack of at least three rolls.

2. The method of claim 1, wherein the first and second nip forming structures are selected from the group consisting of: a roll; a belt; a wire; a combination of a roll and a belt; and a combination of a roll and a wire.

3. The method of claim 1 wherein the step of spraying with the spray nozzles treatment liquid onto the surface of the fibrous web is non-air-assisted.

4. The method of claim 1 wherein the second nip forming structure does not participate in the support of the fibrous web before the fibrous web enters the first nip and further comprising the step of limiting a flow of air and treatment medium mist between the spray box and the second nip forming structure with a flow limiter device.

5. The method of claim 1 wherein the step of spraying with spray nozzles is performed by spray nozzles arranged on a side of the liquid spray chamber where the fibrous web enters the liquid spray chamber.

6. The method of claim 1 wherein the step of spraying treatment liquid comprises using as the treatment liquid water or an agent which strengthens the fibrous web or a mixture of liquid water and an agent which strengthens the fibrous web.

7. The method of claim 1 wherein at least one of the first nip forming structure and the second nip forming structure is heated.

8. The method of claim 1 wherein the treatment liquid is water.

9. The method of claim 1 wherein the step of forming the second calender nip is between the third nip forming structure, and the fourth nip forming structure of the wetstack calender.

10. A method for treating a fibrous web with a liquid in a wetstack calender of at least three nip forming structures, the method comprising the steps of:

forming a liquid spray chamber between a first spray box and a surface of an unsupported fibrous web and an adjacent first nip forming structure which is mounted for movement in the wetstack calender;

forming a first nip between the adjacent first nip forming structure and a further nip forming structure which is mounted for movement;

guiding the fibrous web into the liquid spray chamber and into the first nip wherein motion of the web into the first nip defines a first direction;

spraying with spray nozzles, positioned by the first spray box, treatment liquid onto the surface of the unsupported fibrous web spaced from the first nip in a direction opposite the direction defined by the motion of the web into the first nip;

removing air or treatment medium mist from the liquid spray chamber; and after spraying treatment liquid onto the surface of the fibrous web pressing the fibrous web into the first nip;

forming a second liquid spray chamber between a second spray box and a surface of the fibrous web which is supported on an adjacent third nip forming structure which is mounted for movement;

forming a second nip between the adjacent third nip forming structure and the second nip forming structure in the wetstack calender;

guiding the fibrous web into the second liquid spray chamber and into the second nip;

spraying with spray nozzles, positioned by the second spray box, treatment liquid onto the surface of the supported fibrous web spaced upstream from the second nip;

removing air or treatment medium mist from the second liquid spray chamber; and after spraying treatment liquid onto the surface of the fibrous web pressing the fibrous web into the second nip.

11. A method for treating a fibrous web with a liquid in a wetstack calender of at least three calender rolls forming nips therebetween, the method comprising the steps of:

forming a first calender nip between a first calender roll and, a second calender roll of the wetstack calender;

forming a first liquid spray chamber between a first spray box, the fibrous web, and at least one of the first and second calender rolls;

spraying with liquid spray nozzles, positioned by the first spray box, treatment liquid onto a surface of the fibrous web, followed by passing the web through the first calender nip;

forming at least a second calender nip between the second calender roll or a third calender roll, with a fourth calender roll of the wetstack calender;

forming a second liquid spray chamber between a second spray box and the third calender roll and the fourth calender roll; and spraying with liquid spray nozzles, positioned by the second spray box, treatment liquid onto a surface of the fibrous web while the web is supported on a surface of the second or third calender roll, followed by passing the web through the second nip.

12. The method of claim 11 wherein both steps of spraying with the liquid spray nozzles are non-air-assisted.

13. The method of claim 11 wherein the step of forming the calender nip is between the third calender roll, and the fourth calender roll of the wetstack calender.

14. The method of claim 11 wherein the at least one of the calender rolls is a combination of a roll and a belt or a combination of a roll and a wire.

15. The method of claim 11 further comprising the step of removing air and treatment medium mist from at least one of said first or second liquid spray chambers with a suction opening which leads from the at least one of said first or second liquid spray chambers to the inside of the corresponding first or second spray box and hence to a suction box, to prevent treatment medium mist generated in the at least one of said first or second liquid spray chambers from spreading outside said first or second liquid spray chambers.

16. The method of claim 11 further comprising the step of using a flow limiter device arranged between the first spray box and at least one of the first and second calender rolls so as to limit a flow of air and treatment medium mist between the first liquid spray chamber and an exterior of the first liquid spray chamber.

17. The method of claim 11 further comprising the step of using a flow limiter device arranged between the second spray box and the fourth calender roll so as to limit a flow of air and treatment medium mist between the first liquid spray chamber and an exterior of the second liquid spray chamber.

18. The method of claim 11 wherein the step of spraying treatment liquid positioned by the first spray box onto the surface of the fibrous web is accomplished while the fibrous web is unsupported.

19. The method of claim 11 wherein the step of spraying treatment liquid positioned by the first spray box onto the surface of the fibrous web is accomplished while the fibrous web is supported on a roll surface formed by the first calender roll or the second calender roll.

20. The method of claim 11 wherein the treatment liquid is water.

\* \* \* \* \*